United States Patent [19]
Petroni et al.

[11] Patent Number: 5,987,411
[45] Date of Patent: Nov. 16, 1999

[54] RECOGNITION SYSTEM FOR DETERMINING WHETHER SPEECH IS CONFUSING OR INCONSISTENT

[75] Inventors: Marco Petroni, Cote St-Luc; Hung S. Ma, Beaconsfield, both of Canada

[73] Assignee: Northern Telecom Limited, Canada

[21] Appl. No.: 08/992,260

[22] Filed: Dec. 17, 1997

[51] Int. Cl.[6] ........................................... G01L 9/00

[52] U.S. Cl. .................. 704/255; 704/239; 704/241; 704/238; 704/251

[58] Field of Search ..................... 704/255, 251, 704/239, 240, 241, 238

[56] References Cited

U.S. PATENT DOCUMENTS

| | | | |
|---|---|---|---|
| 5,097,509 | 3/1992 | Lennig | 704/240 |
| 5,452,397 | 9/1995 | Ittycheriah et al. | 704/240 |
| 5,732,393 | 3/1998 | Aoshima | 704/246 |
| 5,799,274 | 9/1998 | Kuroda | 704/239 |

*Primary Examiner*—Susan Wieland
*Attorney, Agent, or Firm*—Finnegan, Henderson, Farabow, Garrett & Dunner, L.L.P.

[57] ABSTRACT

Methods and systems consistent with the present invention enroll a candidate phrase uttered by a user in a dictionary having at least one previously enrolled phrase. The system receives utterances of the candidate phrase and determines whether the first utterance is confusingly similar to a previously enrolled phrase and whether they are consistent with each other. The system then enrolls the candidate phrase in the dictionary according to these determinations.

28 Claims, 5 Drawing Sheets

RECOGNITION SYSTEM FOR DETERMINING WHETHER SPEECH IS CONFUSING OR INCONSISTENT

BACKGROUND OF THE INVENTION

A. Field of the Invention

The present invention relates generally to methods and systems for recognizing speech, and, more particularly, to voice recognition methods and systems for evaluating candidate utterances before enrolling them in a recognition dictionary.

B. Description of the Related Art

In recent years, voice recognition systems have become both more popular and more sophisticated. Voice Activated Dialing (VAD) systems, for example, use voice recognition systems to speed dial or access a party based upon a single voice command. In a VAD system, the voice command is typically the name of the party the user wishes to call, such as the phrase "Bob Johnson." The VAD system then accesses a pre-programmed dictionary containing telephone numbers associated with each pre-programmed party. Once the VAD system locates the entry for "Bob Johnson," it will then call the corresponding telephone number.

One problem with VAD systems is that users will sometimes enter the same phrase or a confusingly similar phrase into the dictionary. For instance, if a user enters the phrase "Bob Johnson" when another party by that name already exists in the dictionary, the wrong telephone number may be called depending upon which "Bob Johnson" the user intends to reach. An error may also occur if the user adds a confusingly similar name, such as "Bob Johnston." Thus, when the user tries to call "Bob Johnston," the VAD system may erroneously dial the number for "Bob Johnson" instead.

U.S. Pat. No. 5,452,397 discloses a VAD system which accounts for the storage of phrases that are the same or confusingly similar to previously enrolled phrases. According to this method, the user must utter a candidate phrase two times to store that phrase in the dictionary. The system stores the first utterance of the candidate phrase in the dictionary and assigns that phrase, and each previously existing phrase in the dictionary, a probability representing the likelihood that each respective phrase will be the same as the second utterance of the candidate phrase said by the user. The '397 patent discloses that the candidate phrase is assigned a lower probability (e.g. 0.8) than that assigned to the other phrases already enrolled in the dictionary (e.g. 1.0). This augments or skews the dictionary toward the likelihood that the second utterance of the candidate phrase will be recognized as one of the previously enrolled phrases rather than the first utterance of the candidate phrase. The VAD system then receives the second utterance of the candidate phrase and compares it to each of the phrases enrolled in the augmented dictionary to determine whether the candidate phrase should be enrolled.

One problem with the method and system disclosed in the '397 patent is that by assigning a lower probability to the first utterance of the candidate phrase, the dictionary is biased towards determining that the candidate phrase will be confusing. This, in turn, increases the probability of false rejections of phrases sought to be enrolled in the VAD system. Another problem with the '397 patent is that when a phrase is found to be confusing, the user is required to repeat the entire entry process over again in order to try to store the candidate phrase. The approach disclosed in the '397 patent also fails to ensure that the first and second utterances of the candidate phrase are consistent with one another. Thus, an error may occur when the two utterances are said differently by the user. There is a need, therefore, for a voice recognition system which can accurately determine the confusability or inconsistency of a candidate phrase in a user-friendly environment.

SUMMARY OF THE INVENTION

Systems consistent with the present invention prevent confusing or inconsistent phrases from being enrolled in a dictionary of a voice recognition system. Upon testing phrases for confusability and inconsistency, the system provides the user with an indication as to whether the phrase was enrolled in the dictionary.

To achieve these and other advantages, methods and systems consistent with the present invention enroll a candidate phrase uttered by a user in a dictionary having at least one previously enrolled phrase stored therein. A system consistent with this invention receives a first utterance of the candidate phrase uttered by the user and determines whether the first utterance is confusingly similar to a previously enrolled phrase. A second utterance of the candidate phrase uttered by the user is then received, and the system determines whether the second utterance is confusingly similar to a previously enrolled phrase. Next, the system determines whether the first utterance is inconsistent with the second utterance. Finally, the system enrolls the candidate phrase in the dictionary according to the determinations of whether the first and second utterances are confusing and whether the first and second utterances are inconsistent.

Both the foregoing general description and the following detailed description are exemplary and provide further explanation of the invention as claimed.

BRIEF DESCRIPTION OF THE DRAWINGS

The accompanying drawings provide a further understanding of the invention and, together with the Detailed Description, explain the principles of the invention. In the drawings.

DETAILED DESCRIPTION

A. Introduction

Systems and methods consistent with the invention determine whether a candidate phrase uttered by a user is confusing or inconsistent. The determinations for confusability and inconsistency are performed before the system enrolls the candidate phrase in a recognition dictionary. A confusability determination unit determines confusability by comparing the candidate phrase to each of the pre-existing entries enrolled in the dictionary. An inconsistency determination unit determines inconsistency of the candidate phrase by determining whether two utterances of the candidate phrase are repetitions of the same phrase.

Based on the results of these two tests, the system informs the user whether the phrase can be enrolled in the dictionary or whether the user must utter the candidate phrase for a third time for further testing. If the system determines that the phrase should not be enrolled in the dictionary based on the tests, the user will be informed why the phrase was rejected. When the system does enroll the phrase in the dictionary, the system will train the dictionary entry for the candidate phrase using a pair of utterances of the candidate phrase. While the invention is described as being used in the context of a voice activated dialing (VAD) system, the invention may be used with other types of voice recognition systems as well.

B. System Structure

Figure 1:
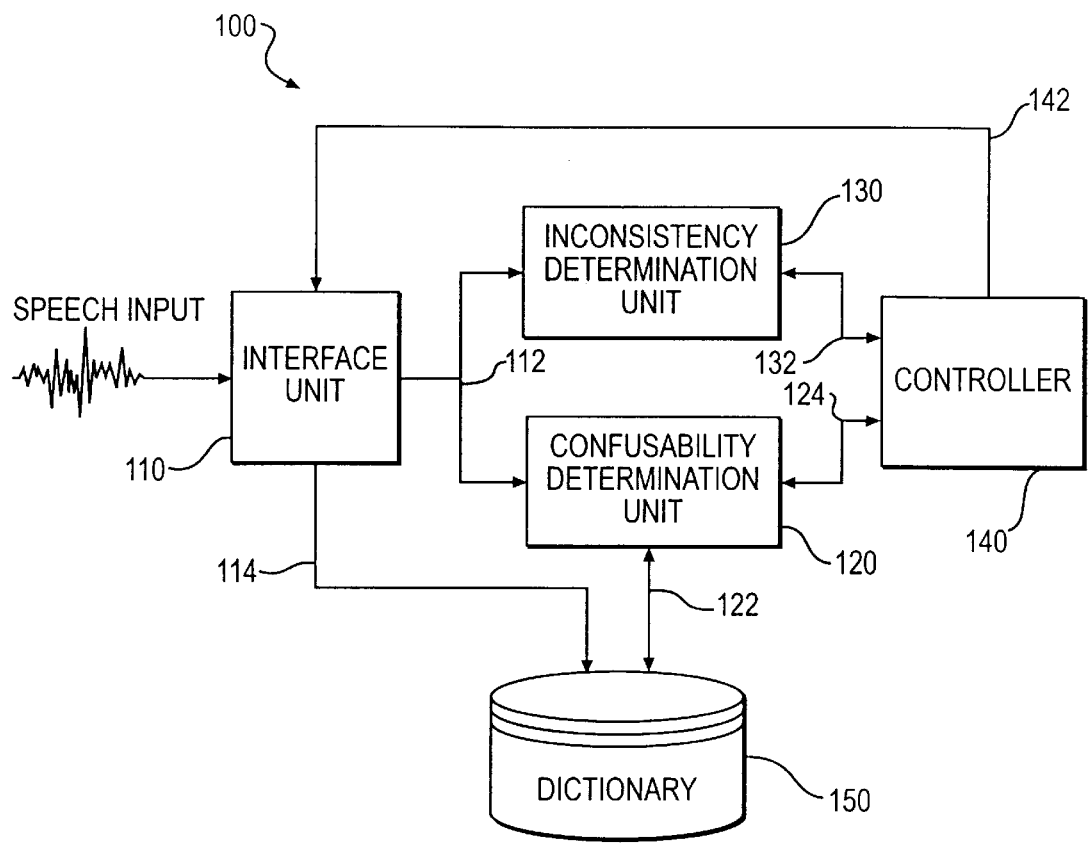
FIG. 1 is a block diagram showing a voice activated dialing (VAD) system 100 consistent with the present invention.

FIG. 1 is a block diagram showing a VAD system 100 consistent with the present invention. As shown in FIG. 1, VAD system 100 includes an interface unit 110, a confusability determination unit 120, an inconsistency determination unit 130, a controller 140, and a dictionary 150. System 100 receives candidate phrases uttered by a user and determines whether to enroll the phrases in dictionary 150 for training.

Interface unit 110 initially receives two utterances of a candidate phrase uttered by a user and outputs the uttered phrases to confusability determination unit 120 and inconsistency determination unit 130 over bus line 112. Bus line 112 preferably outputs the uttered phrases sequentially to determination units 120 and 130. However, bus line 112 may be a parallel bus comprising a plurality of data lines connecting interface unit 110 to confusability determination unit 120 and inconsistency determination unit 130. In this case, each data line would correspond a respective utterance of the candidate phrase.

For each utterance of the candidate phrase output from interface unit 110 over bus line 112, confusability determination unit 120 determines whether that utterance is confusingly similar to a pre-existing entry enrolled in dictionary 150. Confusability determination unit 120 accesses dictionary 150 over bus line 122 and then outputs the result of the determination to controller 140 over bus line 124. Inconsistency determination unit 130 also receives utterances of the candidate phrase from interface unit 110 over bus line 112 and determines whether two utterances of the candidate phrase are consistent with one another. Inconsistency determination unit 130 then outputs, over bus line 132, the result of the determination to controller 140.

On the basis of the results output by determination units 120 and 130, controller 140 determines whether to prompt the user to input a third utterance of the candidate phrase. If a third utterance is not required, controller 140 outputs a result signal over bus line 142 indicating whether a entry of dictionary 150 was trained using the candidate phrase. If controller 140 determines that a third utterance is required, then controller 140 outputs over bus line 142 a control signal to interface unit 110. In response, interface unit 110 prompts the user to utter a third utterance of the candidate phrase and outputs this third utterance to determination units 120 and 130 over bus line 112. According to the results of confusability determination unit 120 and inconsistency determination unit 130 based on the third utterance, controller 140 outputs a result signal over bus line 142 indicating whether an entry of dictionary 150 was trained using the candidate phrase. When an entry of dictionary 150 is trained using the candidate phrase, interface unit 110 outputs to dictionary 150 a pair of the utterances of the candidate phrase over bus line 114.

C. System Implementation

Figure 2:
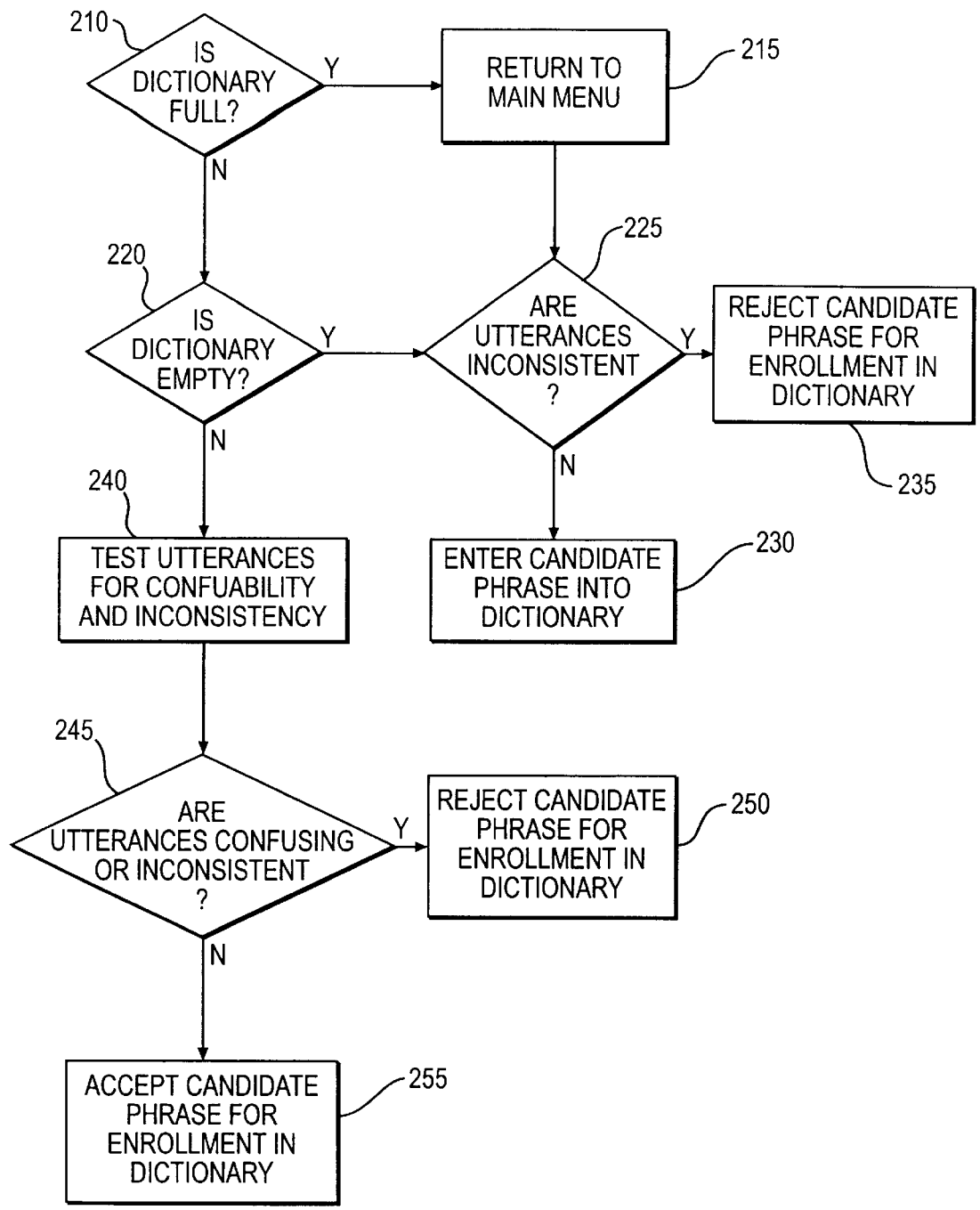
FIG. 2 is a flow diagram showing an enrollment method implemented by VAD system 100 for testing the confusability and inconsistency of a candidate phrase.

FIG. 2 is a flow diagram showing an enrollment method implemented by VAD system 100 for testing the confusability and inconsistency of a candidate phrase. FIG. 2 shows that VAD system 100 first determines whether dictionary 150 is full (step 210). If dictionary 150 is full, interface unit 110 directs the user to delete an old phrase before adding a new one to dictionary 150, and then returns the user to VAD system 100's main menu (step 215). If a candidate phrase can be entered into dictionary 150, VAD system 100 will then determine whether dictionary 150 is empty (step 220). Since confusability is not an issue in this case, controller 140 will train an entry of dictionary 150 using the candidate phrase when inconsistency determining unit 130 determines that the first two utterances of the phrase said by the user are not inconsistent (steps 225 and 230). Inconsistency determination unit 130 enables VAD system 100 to determine whether the utterances are sufficiently consistent with one another in order to allow them to be used to train an entry of dictionary 150. If inconsistency determination unit 130 determines that the utterances are inconsistent, controller 140 will reject the candidate phrase for entry into dictionary 150 (step 235). As noted above, VAD system 100 does not test phrases for confusability in this case because there are no existing dictionary entries with which the phrase may be confused.

When dictionary 150 contains previously enrolled entries, VAD system 100 tests for both confusability and inconsistency. In this case, there is the possibility that the uttered phrases may be confused with one of the pre-existing data entries of dictionary 150. This confusion would prohibit VAD system 100 from distinguishing the candidate phrase from one or more of the existing data entries during voice recognition (such as confusing "Bob Johnston" with "Bob Johnson"). Therefore, confusability determination unit 120 determines whether the phrase is confusing with respect to existing dictionary entries, and inconsistency determination unit 130 determines whether the utterances of the phrase are inconsistent (steps 240 and 245). If determination units 120 and 130 determine that the utterances of the candidate phrase are either confusing or inconsistent, controller 140 will reject the candidate phrase for entry into dictionary 150 (step 250). Otherwise, controller 140 trains an entry of dictionary 150 using the utterances of the candidate phrase (step 255). In either case, interface unit 110 provides an indication to the user as to whether an entry of dictionary 150 was trained using the candidate phrase.

Figure 3:
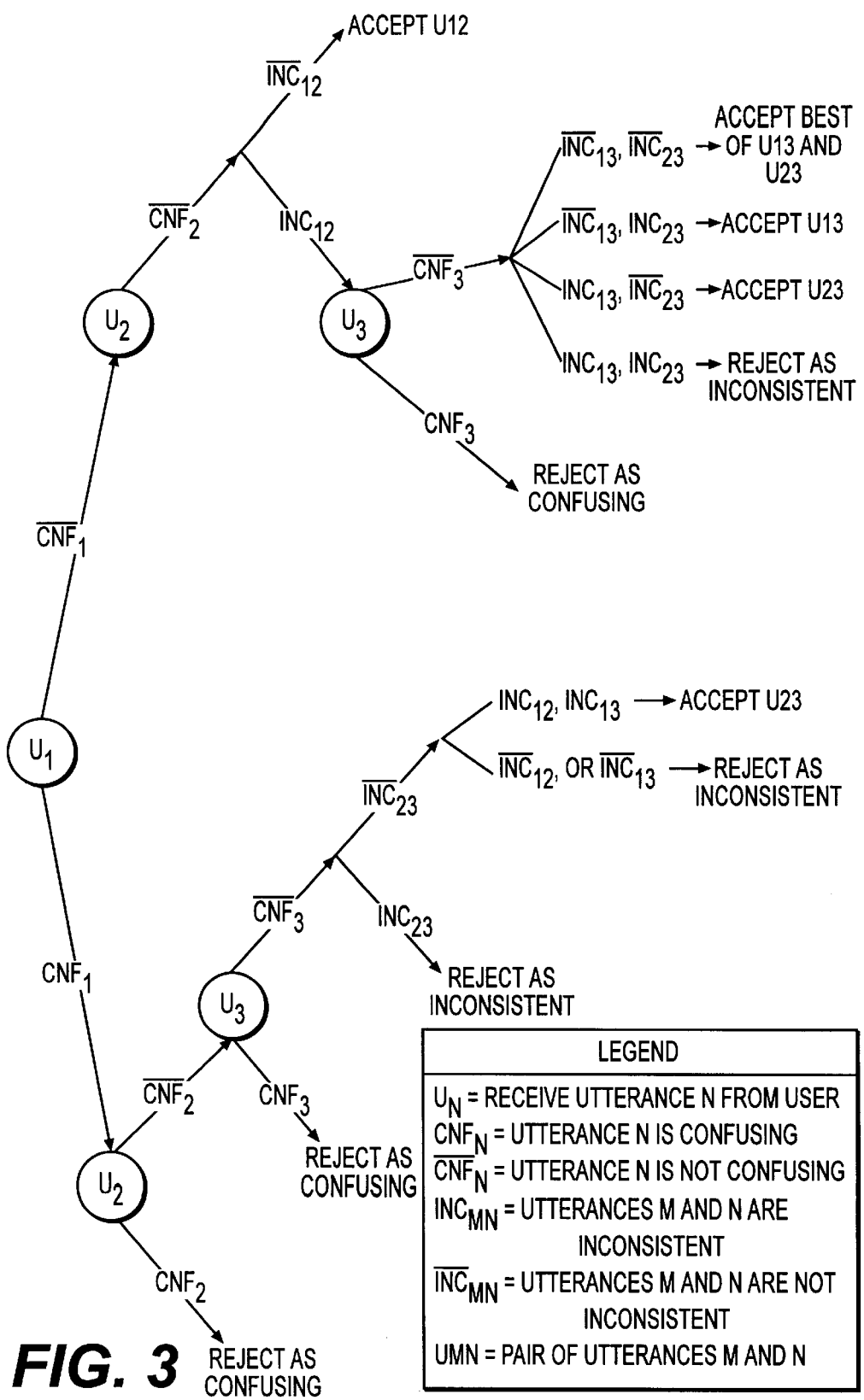
FIG. 3 is a decision tree showing a method for determining whether the accept or reject a candidate phrase for enrollment in a dictionary of VAD system 100.

FIG. 3 is a decision tree showing a method for determining whether the accept or reject an utterance pair of a candidate phrase for training of dictionary 150. The method illustrated by the decision tree of FIG. 3 can be used to implement steps 260 to 290 of FIG. 2. The decision tree of FIG. 3 shows that as each utterance of the candidate phrase is received, VAD system 100 will determine whether the utterance is confusing and will either: (1) determine whether utterances are inconsistent; (2) prompt the user to input an additional utterance of the candidate phrase; (3) reject the utterance because it is confusing with respect to an existing dictionary entry; (4) reject the utterances because they are inconsistent; or (5) accept a pair of utterances for training dictionary 150. The results of these operations can then be output to the user, as described below.

The operation of VAD system 100 along the decision tree's branches will now be described. FIG. 3 shows that the enrollment process along the upper branch of the decision tree begins with interface unit 110 receiving two utterances $U_1$ and $U_2$ of the candidate phrase. As each utterance is received, confusability determination unit 120 determines whether the respective utterance is confusing with respect to previously enrolled entries in dictionary 150. The upper branch of the decision tree illustrates the case for when the utterance $U_1$ is not confusing. If both of the utterances $U_1$ and $U_2$ are found not to be confusing, then inconsistency determination unit 130 will determine whether the two utterances are inconsistent with each other. The two utterances are accepted for training an entry of dictionary 150 if they are not inconsistent, and the process ends upon notification to the user. Otherwise, interface unit 110 prompts the user to input a third utterance $U_3$ of the candidate phrase for further processing.

As shown in FIG. 3, the third utterance $U_3$ then undergoes the same confusability test that was performed on each of the first two utterances. The candidate phrase is rejected if confusability determination unit 120 finds the third utterance confusing. On the other hand, inconsistency determination unit 130 determines the inconsistency between the first and third utterances U13 and the inconsistency between the second and third utterances U23. The utterance pair that is not inconsistent and that has the smallest inconsistency distance, as described below, is accepted for training an entry of dictionary 150.

If U13 and U23 are both not inconsistent, then controller 140 accepts the utterance pair that is less inconsistent. When only one of U13 and U23 are not inconsistent, then controller 140 accepts the utterance pair that is not inconsistent. If each utterance pair is inconsistent, however, controller 140 rejects the candidate phrase for enrollment in dictionary 150 as being inconsistent. In either case, interface unit 110 will indicate to the user whether the candidate phrase was enrolled in dictionary 150. Interface unit 110 may also indicate which utterance pair was used to train an entry of dictionary 150 for the candidate phrase. In the case of rejection, interface unit 110 preferably informs the user as to why the candidate phrase was not enrolled in dictionary 150.

Referring to the lower branch of the decision tree of FIG. 3, the enrollment process begins with interface unit 110 receiving two utterances $U_1$ and $U_2$ of the candidate phrase. As each utterance is received, confusability determination unit 120 determines whether the respective utterance is confusing with respect to previously enrolled entries in dictionary 150. The lower branch of the decision tree illustrates the case for when the utterance $U_1$ is confusing. If both of the utterances $U_1$ and $U_2$ are found to be confusing, then controller 140 rejects the candidate as confusing, and the process ends upon notification to the user. Otherwise, interface unit 110 prompts the user to input a third utterance $U_3$ of the candidate phrase for further processing.

As shown in FIG. 3, the third utterance $U_3$ then undergoes the same confusability test that was performed on each of the first two utterances. The candidate phrase is rejected if confusability determination unit 120 finds the third utterance $U_3$ confusing. On the other hand, inconsistency determination unit 130 determines the inconsistency between the second and third utterances U23. If inconsistency determination unit 130 determines that these utterances are inconsistent, controller 140 will reject the candidate phrase as inconsistent. Otherwise, inconsistency determination unit 130 determines the inconsistency between the first and second utterances U12 and the inconsistency between the first and third utterances U13.

When the first and second utterances U12 and the first and third utterances U13 are both not inconsistent, controller 140 will accept the second and third utterances U23 to train an entry of dictionary. Controller 140 accepts utterances U23 in this case because the utterance pair U23 is not inconsistent, the second and third utterances are each not confusing, and the second and third utterances are each inconsistent with the first utterance which was found to be confusing. Similarly, controller 140 will reject the candidate phrase as inconsistent when either the first and second utterances U12 and the first and third utterances U13 are not inconsistent. Controller 140 will reject the candidate phrase in this case since either the second or third utterance is not inconsistent with the first phrase that confusability determination unit 120 determined to be confusing.

A third utterance may also be required to implement steps 225 to 235 of FIG. 2. For example, inconsistency determination unit 130 first determines whether the two utterances are inconsistent with each other. The two utterances are accepted for training an entry of dictionary 150 if they are not inconsistent. Otherwise, interface unit 110 prompts the user to input a third utterance of the candidate phrase for further processing. Inconsistency determination unit 130 then determines the inconsistency between the first and third utterances and the inconsistency between the second and third utterances. The utterance pair that is not inconsistent and that has the smallest inconsistency distance, as described below, is accepted for training an entry of dictionary 150. More particularly, if the first and third utterances and the second and third utterances are both not inconsistent, then controller 140 accepts the utterance pair that is less inconsistent. When only one pair is not inconsistent, then controller 140 accepts that utterance pair that is not inconsistent. If each utterance pair is inconsistent, however, controller 140 rejects the candidate phrase for enrollment in dictionary 150 as being inconsistent.

1. Testing for Confusability and Inconsistency

Figure 4:
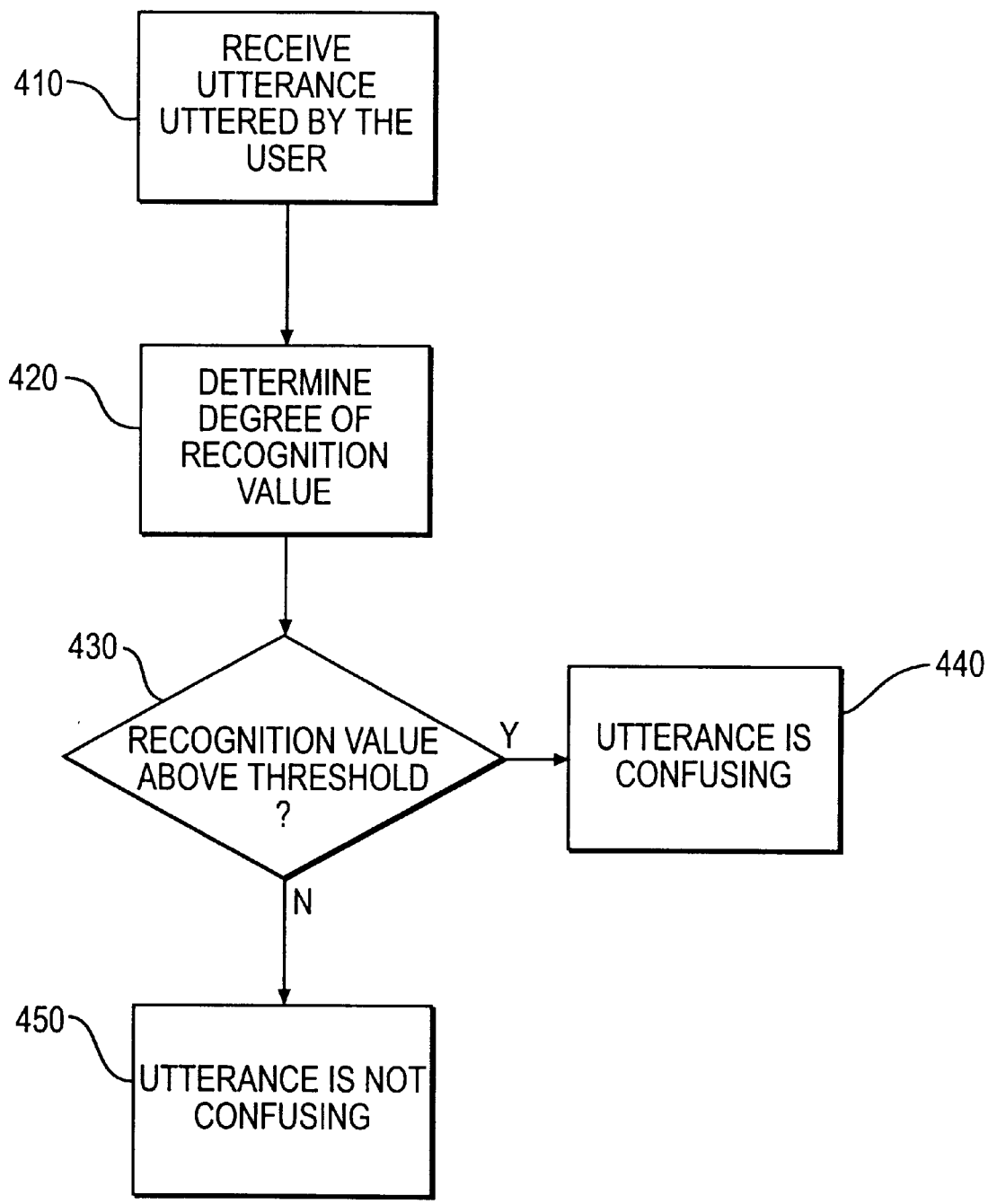
FIG. 4 is a flow diagram showing a method for determining whether an utterance is confusing.

FIG. 4 is a flow diagram showing a method for determining whether a phrase is confusing. FIG. 4 shows that this method begins with the user entering an utterance of the candidate phrase into interface unit 110 (step 410). Confusability determination unit 120 then calculates a value representing the degree to which the utterance is recognized as being one of the pre-existing entries in dictionary 150 (step 420). This value, called the degree of recognition value, is preferably calculated in accordance with the method disclosed in U.S. Pat. No. 5,097,509, the subject matter of which is incorporated herein by reference. U.S. Pat. No. 5,097,509 discloses computing a $P_A$ value representing the probability that an uttered phrase matches a previously stored phrase in a dictionary. However, any other value quantifying the degree to which the utterance matches a phrase previously enrolled in dictionary 150 may also be used in confusability determination unit 120.

Confusability determination unit 120 then compares the degree of recognition value to a threshold to determine whether the utterance is confusing with respect to the pre-existing dictionary entries (step 430). If the recognition value is above the threshold value, then determination unit 120 determines that the utterance is confusing (step 440). Otherwise, confusability determination unit 120 will determine that the utterance is not confusing (step 450). The threshold value can be adjusted to vary how similar a phrase must be in order to be considered confusing. The threshold value is preferably in the range from approximately 0.85 to 0.97, with the lower values favoring less false acceptance at the expense of more false rejection.

Figure 5:
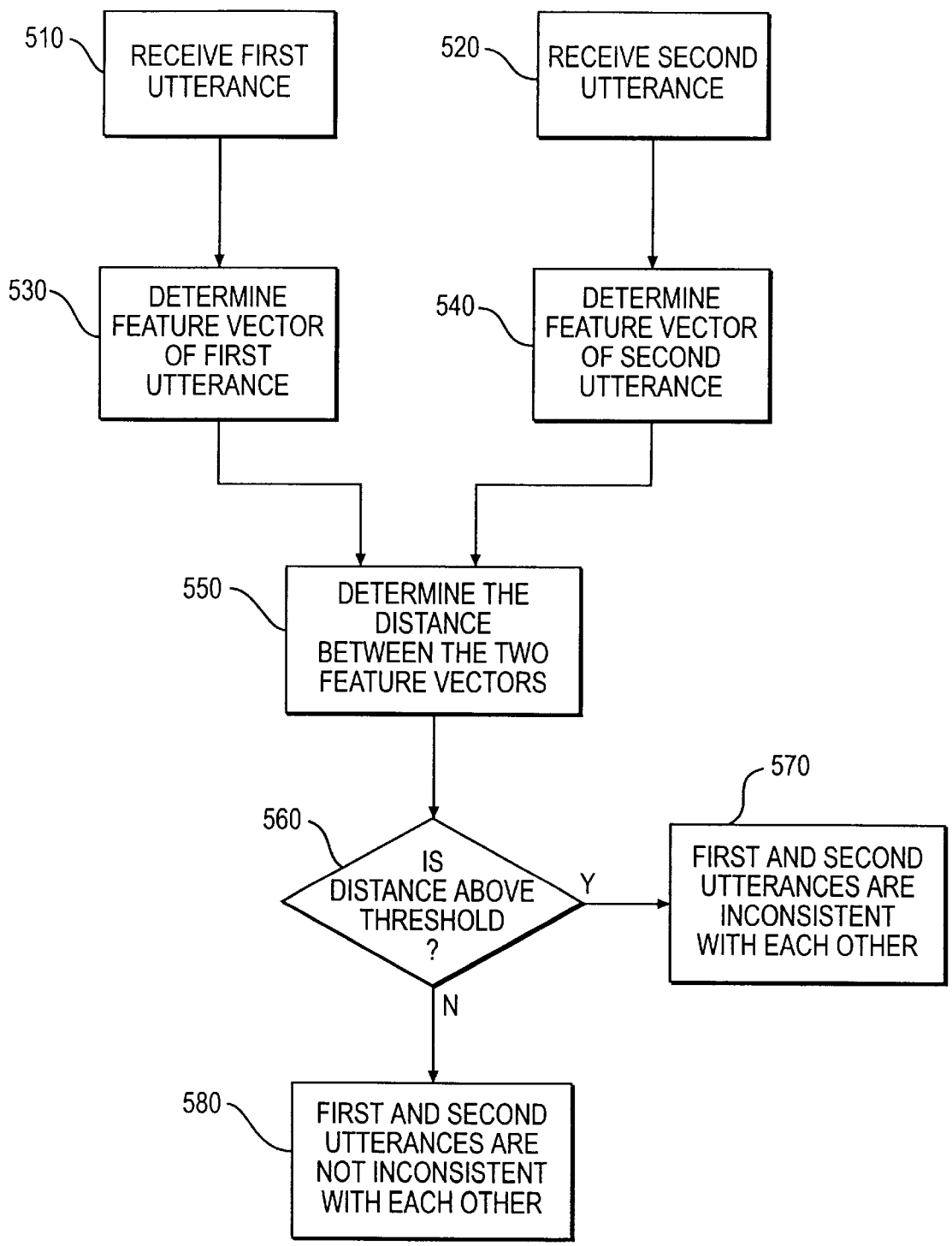
FIG. 5 is a flow diagram showing a method for determining whether an utterance is inconsistent with respect to an utterance previously uttered by the user.

FIG. 5 is a flow diagram showing a method for determining whether an utterance is inconsistent with respect to an utterance previously uttered by the user. As shown in FIG.

5, interface unit 110 receives the two utterances of the candidate phrase from the user (steps 510 and 520). The received utterances are pulse code modulated signals and are transformed into a series of frames. Preferably, each utterance is transformed into forty-eight frames, with each frame consisting of twenty-three coefficients comprising eleven cepstrum coefficients and twelve delta cep coefficients. Based on the first fifteen coefficients for each frame (the eleven cepstrum coefficients and the first four delta cep coefficients), inconsistency determination unit 130 calculates a feature vector for each utterance (steps 530 and 540). Determination unit 130 then calculates the distance between the two feature vectors over the forty-eight frames representing each utterance (step 550).

Inconsistency determination unit 130 preferably computes the distance value by determining the dynamic time warping distance between the two feature vectors. The dynamic time warp computation may be as that described by Hunt, Lennig, and Mermelstein in a chapter entitled "Use of Dynamic Programming in a Syllable-Based Continuous Speech Recognition System" in *Time Warps, String Edits, and Macromolecules: The Theory and Practice of Sequence Comparison,* D. Sankoff and J. B. Kruskal, eds. Addison-Wesley (Reading Mass.), pp. 163–87, 1983. While systems consistent with the present invention use dynamic time warping as a means of comparing the two utterances to one another, other methods are known, such as Hidden Markov Modeling (HMM). With HMM, the utterances of the candidate phrase are represented by models and the distance between the two models is expressed as a likelihood score.

Inconsistency determination unit 130 then compares the computed distance value to a threshold value (step 560). If the distance is above the threshold value, then inconsistency determination unit 130 determines that the utterances are inconsistent (step 570). Otherwise, determination unit 130 determines that the utterance pair is not inconsistent with one another (step 580). While other threshold values may be used, inconsistency determination unit 130 preferably uses a threshold value equal to 17.

D. Conclusion

It will be apparent to those skilled in the art that various modifications and variations can be made to the system and method of the present invention without departing from the spirit or scope of the invention. The present invention covers the modifications and variations of this invention provided they come within the scope of the appended claims and their equivalents. For instance, instead of using two confusability tests, only one could be used.

What is claimed is:

1. A system for enrolling candidate phrases uttered by a user in a dictionary having at least one previously enrolled phrase stored therein, the system comprising:

means for receiving a first utterance of the candidate phrase uttered by the user;

first means for determining whether the first utterance is confusingly similar to a previously enrolled phrase;

means for receiving a second utterance of the candidate phrase uttered by the user;

second means for determining whether the second utterance is confusingly similar to a previously enrolled phrase;

third means for determining whether the first utterance is inconsistent with the second utterance; and means for enrolling the candidate phrase in the dictionary according to the determinations made by the first, second and third means for determining.

2. The system of claim 1, wherein the first and second means for determining further include:

means for forming a recognition value representing a degree to which an utterance of the candidate phrase matches a previously enrolled phrase; and means for comparing the recognition value to a threshold value to determine whether the utterance is confusingly similar a previously enrolled phrase.

3. The system of claim 2, wherein the means for comparing further includes:

means for comparing the recognition value to the threshold value having a value between 0.85 and 0.97.

4. The system of claim 2, wherein the first and second means for determining further include:

means for concluding that the utterance is confusing when the recognition value is above the threshold value.

5. The system of claim 1, wherein the third means for determining further includes:

means for converting each utterance into a feature vector;

means for forming a distance value between the feature vectors representing each utterance; and means for comparing the distance value to a threshold value.

6. The system of claim 5, wherein the means for comparing further includes:

means for comparing the distance value to the threshold value having a value equal to 17.

7. The system of claim 5, wherein the third means for determining further includes:

means for concluding that the utterance is inconsistent when the distance value exceeds the threshold value.

8. The system of claim 5, wherein the means for forming the distance value further includes:

means for finding a dynamic time warping distance between the feature vectors representing each utterance.

9. The system of claim 1, further including:

means for receiving a third utterance of the candidate phrase said by the user according to determinations made by the first, second and third means for determining.

10. The system of claim 9, further including:

fourth means for determining whether the third utterance is confusingly similar to a previously enrolled phrase.

11. The system of claim 10, further including:

fifth means for determining whether the third utterance is inconsistent with the first utterance and the second utterance.

12. The system of claim 11, wherein the means for enrolling the candidate phrase further includes:

means for enrolling the candidate phrase in the dictionary according to the determinations made by the fourth and fifth means for determining.

13. The system of claim 1, further including:

means for indicating to the user why the candidate phrase was not enrolled in the dictionary when the means for enrolling the candidate phrase determines that the candidate phrase should not be enrolled in the dictionary.

14. The system of claim 1, further including:

means for indicating to the user why the candidate phrase was enrolled in the dictionary when the means for enrolling the candidate phrase determines that the candidate phrase should be enrolled in the dictionary.

15. A method for enrolling candidate phrases uttered by a user in a dictionary having at least one previously enrolled phrase stored therein, the method comprising:

receiving a first utterance of the candidate phrase uttered by the user;

determining whether the first utterance is confusingly similar to a previously enrolled phrase;

receiving a second utterance of the candidate phrase uttered by the user;

determining whether the second utterance is confusingly similar to a previously enrolled phrase;

determining whether the first utterance is inconsistent with the second utterance; and enrolling the candidate phrase in the dictionary according to the determination of whether the first and second utterances are confusing and whether the first and second utterances are inconsistent.

16. The method of claim 15, wherein the step for determining whether the utterances are confusing further includes the substeps of:

forming a recognition value representing a degree to which an utterance of the candidate phrase matches a previously enrolled phrase; and comparing the recognition value to a threshold value to determine whether the utterance is confusingly similar to a previously enrolled phrase.

17. The method of claim 16, wherein the substep of comparing further includes the substep of:

comparing the recognition value to the threshold value having a value between 0.85 and 0.97.

18. The method of claim 16, wherein the step of determining whether the utterances are confusing further includes the substep of:

concluding that the utterance is confusing when the recognition value exceeds the threshold value.

19. The method of claim 15, wherein the step of determining whether the utterances are inconsistent further includes the substeps of:

converting each utterance into a feature vector;

forming a distance value between the feature vectors representing each utterance; and comparing the distance value to a threshold value to determine whether the utterances are inconsistent.

20. The method of claim 19, wherein the substep of comparing the distance value further includes the substep of:

comparing the distance value to the threshold value having a value equal to 17.

21. The method of claim 19, wherein the step of determining whether the utterances are inconsistent further includes the substep of:

concluding that the utterance is inconsistent when the distance value exceeds the threshold value.

22. The method of claim 19, wherein the step of determining the distance value further includes the substep of:

finding the distance value by determining a dynamic time warping distance between the feature vectors representing each utterance.

23. The method of claim 15, further including the step of:

receiving a third utterance of the candidate phrase said by the user according to the determination of whether the first and the second utterances are confusing and whether the first and second utterances are inconsistent.

24. The method of claim 23, further including the step of:

determining whether the third utterance is confusingly similar to a previously enrolled phrase.

25. The method of claim 24, further including the step of:

determining whether the third utterance is inconsistent with the first utterance and the second utterance.

26. The method of claim 25, wherein the step of enrolling the candidate phrase further includes the substep of:

enrolling the candidate phrase in the dictionary according to the determination of whether the third utterance is confusing and whether the third utterance is inconsistent with the first and second utterances.

27. The method of claim 15, further including the step of:

indicating to the user why the candidate phrase was not enrolled in the dictionary when the candidate phrase is not enrolled in the dictionary.

28. The method of claim 15, further including the step of:

indicating to the user why the candidate phrase was enrolled in the dictionary when the candidate phrase is enrolled in the dictionary.

\* \* \* \* \*